US012583293B2

(12) United States Patent
Yang et al.

(10) Patent No.: US 12,583,293 B2
(45) Date of Patent: Mar. 24, 2026

(54) GESTURE CONTROL METHOD AND DEVICE FOR VEHICLE MOUNTED ATOMIZER

(71) Applicant: GUANGZHOU ISSYZONE TECHNOLOGY CO.,LIMITED, Guangzhou (CN)

(72) Inventors: Taiping Yang, Shenzhen (CN); Shuneng Huang, Guangzhou (CN); Zegang Ye, Shenzhen (CN)

(73) Assignee: GUANGZHOU ISSYZONE TECHNOLOGY CO., LIMITED, Guangzhou (CN)

( * ) Notice: Subject to any disclaimer, the term of this patent is extended or adjusted under 35 U.S.C. 154(b) by 370 days.

(21) Appl. No.: 18/236,991

(22) Filed: Aug. 23, 2023

(65) Prior Publication Data

US 2025/0018773 A1     Jan. 16, 2025

(30) Foreign Application Priority Data

Jul. 10, 2023   (CN) ......................... 202310838575.X

(51) Int. Cl.
*B60H 3/00* (2006.01)
*G06F 3/01* (2006.01)
*B05B 12/12* (2006.01)

(52) U.S. Cl.
CPC ........... *B60H 3/0035* (2013.01); *G06F 3/017* (2013.01); *B05B 12/122* (2013.01)

(58) Field of Classification Search
CPC ............................. B60H 3/0035; G06F 3/017
See application file for complete search history.

(56) References Cited

U.S. PATENT DOCUMENTS

2009/0046537 A1* 2/2009 Chen ..................... G11B 19/042
                                                                         367/90
2013/0158772 A1* 6/2013 Swenson .............. A01B 69/008
                                                                         701/25
2021/0401044 A1* 12/2021 Qiu ........................ A24F 40/485

FOREIGN PATENT DOCUMENTS

CN        114981153 A   *  8/2022   ............. B62D 49/00
CN        113546259 B   *  4/2023   ........ A61M 15/0001
CN        114732933 B   *  8/2024   ............... A61L 9/14
TW        M643943 U   *  7/2023

* cited by examiner

*Primary Examiner* — Mong-Shune Chung
(74) *Attorney, Agent, or Firm* — Birchwood IP

(57) ABSTRACT

The present disclosure discloses a gesture control method and device for a vehicle mounted atomizer, where the vehicle mounted atomizer includes a light emitting component and a position sensor, the light emitting component actively emits infrared ray having a constant angle, and the position sensor receives the infrared ray. The gesture control method includes: calculating a real-time distance between the light emitting component and an obstacle according to an incident angle of the received infrared ray, presetting a distance threshold, generating a first control command when the real-time distance is less than the distance threshold, triggering a connection or disconnection of a switch unit by the first control command, coupling an atomization piece of the vehicle mounted atomizer with a power supply unit via the switch unit, detecting a current on/off state of the switch unit, and generating a corresponding voice prompt according to the on/off state.

7 Claims, 1 Drawing Sheet

Calculating a real-time distance between the light emitting component and an obstacle according to an incident angle of the received infrared ray — S1

Presetting a distance threshold, generating a first control command in a condition that the real-time distance is less than the distance threshold, triggering a connection of disconnection of a switch unit by the first control command, coupling an atomization piece of the vehicle mounted atomizer with a power supply unit via the switch unit, detecting a current on/off state of the switch unit, and generating a corresponding voice prompt according to the on/off state — S2

Calculating a real-time distance between the light emitting component and an obstacle according to an incident angle of the received infrared ray — S1

Presetting a distance threshold, generating a first control command in a condition that the real-time distance is less than the distance threshold, triggering a connection of disconnection of a switch unit by the first control command, coupling an atomization piece of the vehicle mounted atomizer with a power supply unit via the switch unit, detecting a current on/off state of the switch unit, and generating a corresponding voice prompt according to the on/off state — S2

GESTURE CONTROL METHOD AND DEVICE FOR VEHICLE MOUNTED ATOMIZER

CROSS-REFERENCE TO RELATED APPLICATIONS

This application claims the benefit and priority of Chinese patent application No. 202310838575.X, filed on Jul. 10, 2023, disclosure of which is hereby incorporated by reference in its entirety.

TECHNICAL FIELD

The present disclosure relates to the technical field of vehicle mounted atomizers and, in particular, to a gesture control method and device for a vehicle mounted atomizer.

BACKGROUND

The existing control methods for vehicle mounted atomizers are mainly based on button operation, which is cumbersome and complex during use, and causes inconvenience and safety hazards during driving. In view of this, voice-controlled vehicle mounted atomizers have also appeared on the market, such as a voice controlled intelligent vehicle humidifier disclosed in CN208393047U. However, when a vehicle is driving on a highway, a noise transmitted from the chassis of the vehicle and wind noise will increase an environmental noise inside the vehicle, and the environmental noise of most vehicles will reach over 75 decibels. In a noisy environment, the internal environment noise will interfere with a transmission of voice signals, therefore reducing a recognition rate and rendering the voice control of the vehicle mounted atomizer invalid.

SUMMARY

For the issue of easy interference in voice control, the present disclosure provides a gesture control method and device for a vehicle mounted atomizer, aiming to improve a control accuracy of the vehicle mounted atomizer.

To solve the above technical problem, a first aspect of the present disclosure provides a gesture control method for a vehicle mounted atomizer, where the vehicle mounted atomizer includes a light emitting component fixedly installed on the front of the vehicle mounted atomizer and a position sensor, where the light emitting component is configured to actively emit infrared ray having a constant angle, and the position sensor is configured to receive the infrared ray, and the control method includes:

calculating a real-time distance between the light emitting component and an obstacle according to an incident angle of the received infrared ray;

presetting a distance threshold, generating a first control command in a condition that the real-time distance is less than the distance threshold, triggering a connection or disconnection of a switch unit by the first control command, coupling an atomization piece of the vehicle mounted atomizer with a power supply unit via the switch unit, detecting a current on/off state of the switch unit, and generating a corresponding voice prompt according to the on/off state.

In an embodiment, the gesture control method includes: causing the vehicle mounted atomizer to enter a switch control stage in a condition that a first preset time is passed and a connection of the switch unit is triggered by first control command, and triggering a disconnection of the switch unit by the first control command after the first preset time.

In an embodiment, the gesture control method includes: causing the vehicle mounted atomizer to be in an atomization amount control stage during the first preset time and after the connection of the switch unit is trigged by first control command, detecting and accumulating a generation time of the first control command during the first preset time, and generating a second control command according to a mapping relationship of the generation time, where the second control command triggers the switch unit to turn on or off according to a preset PWM pulse width.

In an embodiment, the first preset time is 3-5 seconds.

In an embodiment, the gesture control method includes: presetting an illuminance threshold to obtain an environmental illuminance, and generating a third control command in a condition that the environmental illuminance is less than the illuminance threshold and the connection of the switch unit is detected, where the third control command triggers a lighting unit of the vehicle mounted atomizer to couple with the power supply unit thereof.

In an embodiment, the gesture control method includes: presetting an illuminance threshold to obtain an environmental illuminance, and generating a fourth control command in a condition that the environmental illuminance is greater than the illuminance threshold and the connection of the switch unit is detected, where the fourth control command triggers the lighting unit of the vehicle mounted atomizer to uncouple with the power supply unit thereof.

In an embodiment, the gesture control method includes: detecting an identifier contained in the second control command during an effective period of the third control command, and generating a fifth control command according to the identifier, where the fifth control command triggers a driver of the lighting unit to modulate according to the preset PWM pulse width.

In an embodiment, the gesture control method includes: detecting an identifier contained in the second control command during the effective period of the third control command, and generating a fifth control command according to the identifier, where the fifth control command triggers the driver of the lighting unit to light up a lamp bead with a preset colour.

In an embodiment, the gesture control method includes: transmitting a status data of the vehicle mounted atomizer in real-time to a vehicle central control via a Bluetooth connection.

A second aspect of the present disclosure provides a gesture control device for a vehicle mounted atomizer, where the vehicle mounted atomizer includes a light emitting component fixedly installed on the front of the vehicle mounted atomizer and a position sensor, where the light emitting component is configured to actively emit infrared ray having a constant angle, and the position sensor is configured to receive the infrared ray, where the gesture control device includes:

a distance calculation module, configured to calculate a real-time distance between the light emitting component and an obstacle according to an incident angle of the received infrared ray, and a first control triggering module, configured to preset a distance threshold, generate a first control command in a condition that the real-time distance is less than the distance threshold, trigger a connection or disconnection of a switch unit by the first control command, couple an atomization piece of the vehicle mounted atomizer with a power source unit via the switch unit, detect a current on/off state of the switch unit, and generate a corresponding voice prompt according to the on/off state.

The beneficial effect of the present disclosure is to simulate and determine whether a user is waving by detecting a distance between an obstacle and a light emitting component. PSD (position sensitive detector) distance detection hardware has low cost, high detection accuracy, strong anti-interference ability, and it can effectively improve the safety during driving, balance the user's experience, safety in use, and cost of a product.

BRIEF DESCRIPTION OF DRAWINGS

FIG. 1 is a flowchart of a gesture control method for a vehicle mounted atomizer of a first embodiment of the present disclosure.

DETAILED DESCRIPTION

The following will provide a clear and complete description of the technical solution in the embodiments of the present disclosure in conjunction with the accompanying drawings. It is understandable that the described embodiments are a part of the embodiments of the present disclosure, rather than all of them. Based on the embodiments in the present disclosure, all other embodiments obtained by ordinary technical personnel in the art without creative work fall within the protection scope of the present disclosure.

It should be understood that when terms "include" and "comprise" used in the description and the accompanying claims, which indicate the presence of the described feature, integral, step, operation, element, and/or component, but do not exclude the presence or addition of one or more other features, integrals, steps, operations, elements, components, and/or a combination thereof.

It should also be understood that the term used in the description of the present disclosure is only for the purpose of describing a specific embodiment and is not intended to limit the present disclosure. As used in the description of the present disclosure and the accompanying claims, unless the context clearly indicates other circumstances, the singular form of "a", "an", and "the" are intended to include the plural form.

It should also be further understood that the term "and/or" used in the description of the present disclosure and the accompanying claims refers to any combination of one or more of the related listed items and all possible combinations, and includes these combinations.

As used in the present description and the accompanying claims, the term "if" can be interpreted as "when" or "once" or "in response to determination" or "in response to detection" depending on the context. Similarly, the phrases "if determined" or "if detected (described condition or event)" can be interpreted according to the context to mean "once determined" or "in response to determination" or "once detected (described condition or event)" or "in response to detected (described condition or event)".

Embodiment 1

An embodiment provides a gesture control method for a vehicle mounted atomizer, the vehicle mounted atomizer includes a light emitting component fixedly installed on the front of the vehicle mounted atomizer and a position sensor, where the light emitting component is configured to actively emit infrared ray having a constant angle, and the position sensor is configured to receive the infrared ray; as shown in FIG. 1, a specific step of the gesture control method includes:

S1, calculating a real-time distance between the light emitting component and an obstacle according to an incident angle of the received infrared ray;

In step S1, a gesture detection principle used is an infrared PSD ranging, which belongs to an optical triangulation ranging. The light emitting component emits infrared ray having a fixed angle. According to the distance between the obstacle and the light emitting component, the incident angles of the infrared ray received by the position sensor are different, and the real-time distance between the light emitting component and the obstacle is finally calculated according to the Trigonometric functions, this step uses a distance detection to simulate a gesture detection to a certain extent (such as a user's waving motion), or uses any entity to approach the light emitting component. In fact, regardless of the gesture or action, it requires some obstacle to approach the light emitting component to achieve an expected effect. Optionally, the above light emitting component and position sensor can be integrated into one PSD (position sensitive detector) sensor.

S2, presetting a distance threshold, generating a first control command in a condition that the real-time distance is less than the distance threshold, triggering a connection of disconnection of a switch unit by the first control command, coupling an atomization piece of the vehicle mounted atomizer with a power supply unit via the switch unit, detecting a current on/off state of the switch unit, and generating a corresponding voice prompt according to the on/off state.

In step S2, the distance threshold is input into a controller of the vehicle mounted atomizer by a developer or a user in advance. During the use of the vehicle mounted atomizer, when the user waves by hands to cover the emitted infrared ray, the controller immediately determines that there is an obstacle entering a detection range, and generates the first control command. It should be noted that the first control command can control the switch unit to connect or disconnect, and it is specifically depended on the on/off state of the switch unit before being controlled. If the switch unit is in the off state before being controlled, the first control command triggers the switch unit to be connected, and the atomization piece of the vehicle mounted atomizer is coupled with the power supply unit via the switch unit to enter an operating state. At the same time, it is also necessary to detect the on/off state of the switch unit to generate the voice prompt, and a voice playback unit of the vehicle mounted atomizer plays a prompt of "start".

In this technical scheme, the distance between obstacles and light emitting component is mainly detected to simulate and determine whether the user has waved hands. PSD distance detection hardware has low cost, high detection accuracy, and strong anti-interference ability, it can effectively improve the safety during driving, balance the user's experience, safety in use, and cost of the product.

In order to improve the user's experience and improve the safety of product when in use, on the basis of steps S1 and S2, the gesture control method further includes the following steps S3 to S9, with no absolute sequence between steps S3 to S9.

S3, causing the vehicle mounted atomizer to enter a switch control stage in a condition that a first preset time is passed and a connection of the switch unit is triggered by the first control command, and triggering a disconnection of the switch unit by the first control command after the first preset time.

In step S3, when the first control command triggers the switch unit to be connected, a certain blank time is reserved to prevent users from misoperating the switch unit to be disconnected in a short period of time caused by repeatedly waving. The first preset time is 3-5 seconds, and it allows the user to adjust the first preset time within this range. In this embodiment, 3 seconds for the blank time as a time window for switch control is taken as an example. That is, when the switch unit is connected, the first control command generated within 3 seconds will not be able to control the switch unit to disconnect, and only the first control command generated after 3 seconds will be allowed to control the switch unit to disconnect.

S4, causing the vehicle mounted atomizer to be in an atomization amount control stage during the first preset time and after a connection of the switch unit is trigged by the first control command, detecting and accumulating a generation time of the first control command during the first preset time, and generating a second control command according to a mapping relationship of the generation time, where the second control command triggers the switch unit to turn on and off according to a preset PWM pulse width.

On the basis of step S3, the first preset time mentioned above is utilized as a time window in step S4 for controlling the atomization. In this technical scheme, the controller of the vehicle mounted atomizer will continuously detect the generation time of the first control command within 3 seconds after the switch unit is connected, and the generation time corresponds to different PWM pulse widths. For example, generation times of 2, 3, and 4 correspond to PWM pulse widths having 25%, 50%, and 75%, respectively, Finally, the second control command triggers the switch unit to turn on and off according to the preset PWM pulse width, so as to control an input voltage of the atomization piece. Where, the controlling of the input voltage of the atomization piece correspond to controlling the amount of atomization.

S5, presetting an illuminance threshold to obtain an environmental illuminance, and generating a third control command in a condition that the environmental illuminance is less than the illuminance threshold and a connection of the switch unit is detected, where the third control command triggers a lighting unit of the vehicle mounted atomizer to couple with a power supply unit thereof.

S6, presetting an illuminance threshold to obtain an environmental illuminance, and generating a fourth control command in a condition that the environmental illuminance is greater than the illuminance threshold and the connection of the switch unit is detected, where the fourth control command triggers the lighting unit of the vehicle mounted atomizer to uncouple with the power supply unit thereof.

In steps S5 and S6, the lighting unit is controlled automatically without user's intervention. By comparing the environment illumination and a threshold value of illumination, the lighting unit can be controlled to turn on or off, and the user can be prompted whether the vehicle mounted atomizer is currently running when driving at night. Alternatively, the user can turn off the lighting function by themselves, thereby canceling steps S5 and S6.

S7, detecting an identifier contained in the second control command during an effective period of the third control command, and generating a fifth control command accord-ing to the identifier, where the fifth control command trig-gers a driver of the lighting unit to modulate according to the preset PWM pulse width.

Since the user cannot observe an atomization amount successfully during driving at night, based on steps S4 and S5, multiple control commands are combined in step S7 to link the lighting signal with the atomization amount, thereby, improving users' perception of atomization amount during driving at night. Specifically, during the effective period of the third control command, the atomization amount indicates that a current environmental illumination is insufficient, and it is needed to light the lighting unit. On this basis, since the second control command is associated with the PWM pulse width, and the PWM pulse width can represent a level of atomization. Thus, a corresponding fifth control command can be generated according to the identi-fier contained in the second control command, and a voltage of PWM for the lighting unit can be controlled through the fifth control command, and the voltage of the PWM can also control a brightness level of the lighting unit. For example, the brighter the light, the greater the atomization amount of the current vehicle mounted atomizer. The above identifier can be set according to the developer's needs, or the PWM pulse width corresponding to the second control command can be directly selected as the PWM pulse width that is controlled by the lighting unit. For example, an atomization amount of 75% corresponds to a light intensity of 75%.

S8, detecting an identifier contained in the second control command during the effective period of the third control command, and generating a fifth control command accord-ing to the identifier, where the fifth control command trig-gers the driver of the lighting unit to light up a lamp bead with a preset colour.

Step S8 is a parallel technical scheme of S7, the difference is that in step S8, the lighting unit is controlled to emit light with different colors via the fifth control command, and the atomization level of the current vehicle mounted atomizer is represented by the colour of the light.

S9, transmitting a status data of the vehicle mounted atomizer in real-time to a vehicle central control via a Bluetooth connection.

Embodiment 2

This embodiment provides a gesture control device for a vehicle mounted atomizer, the vehicle mounted atomizer includes a light emitting component fixedly installed on the front of the vehicle mounted atomizer and a position sensor, where the light emitting component is configured to actively emit infrared ray having a constant angle, and the position sensor is configured to receive the infrared ray, the gesture control device includes:

a distance calculation module, configured to calculate a real-time distance between the light emitting compo-nent and an obstacle according to an incident angle of the received infrared ray, a first control triggering module, configured to preset a distance threshold, generate a first control command in a condition that the real-time distance is less than the distance threshold, trigger a connection or disconnec-tion of the switch unit by the first control command, couple an atomization piece of the vehicle mounted atomizer with a power source unit via the switch unit, detect a current on/off state of the switch unit, and generate a corresponding voice prompt according to the on/off state;

a second control triggering module, configured to cause the vehicle mounted atomizer to enter a switch control stage in a condition that a first preset time is passed and a connection of the switch unit is triggered by the first control command; and trigger a disconnection of the switch unit by the control command after the first preset time;

a third control triggering module, configured to cause the vehicle mounted atomizer to be in an atomization amount control stage during the first preset time and after the connection of the switch unit is triggered by the first control command; detect and accumulate a generation time of the first control command during the first preset time; and generate a second control command according to a mapping relationship of the generation time; where the second control command triggers the switch unit to turn on or off according to a preset PWM pulse width;

a fourth control triggering module, configured to preset an illuminance threshold to obtain an environmental illuminance; and generate a third control command in a condition that the environmental illuminance is less than the illuminance threshold and the connection of the switch unit is detected; where the third control command triggers a lighting unit of the vehicle mounted atomizer to couple with the power supply unit thereof;

a fifth control triggering module, configured to preset an illuminance threshold to obtain an environmental illuminance; and generate a fourth control command in a condition that the environmental illuminance is greater than the illuminance threshold and the connection of the switch unit is detected; where the fourth control command triggers the lighting unit of the vehicle mounted atomizer to uncouple with the power supply unit thereof; and a sixth control triggering module, configured to detect an identifier contained in the second control command during an effective period of the third control command, and generate a fifth control command according to the identifier; where the fifth control command triggers a driver of the lighting unit to modulate according to the preset PWM pulse width.

Please refer to the detailed description of steps S1 to S7 in Embodiment 1 for the modules mentioned above. This embodiment of the present disclosure will not be repeated.

Finally, it should be noted that the gesture control method and device disclosed in the embodiments of the present disclosure for a vehicle mounted atomizer are only an exemplary embodiment of the present disclosure, and are only used to illustrate the technical solution of the present disclosure, not to limit it; although the present disclosure has been described in detail with reference to the aforementioned embodiments, ordinary technical personnel in the art should understand that it can still modify the technical solution recorded in the aforementioned embodiments, or equivalently substitute some of the technical features; and these modifications or substitutions do not separate the essence of the corresponding technical solutions from the spirit and scope of the various embodiments of the technical solutions.

The above embodiments are only intended to illustrate the technical concept and characteristics of the present disclosure, and their purpose is to enable ordinary technical personnel in the art to understand the content of the present disclosure and implement it accordingly, without limiting the protection scope of the present disclosure. Any equivalent changes or modifications made based on the essence of the present disclosure should be covered within the protection scope of the present disclosure.

What is claimed is:

1. A gesture control method for a vehicle mounted atomizer, wherein the vehicle mounted atomizer comprises a light emitting component fixedly installed on a front of the vehicle mounted atomizer and a position sensor, wherein, the light emitting component is configured to actively emit infrared ray having a constant angle, and the position sensor is configured to receive the infrared ray, wherein the gesture control method comprises:

calculating a real-time distance between the light emitting component and an obstacle according to an incident angle of received infrared ray;

presetting a distance threshold, generating a first control command in a condition that the real-time distance is less than the distance threshold, triggering a connection or disconnection of a switch unit by the first control command, coupling an atomization piece of the vehicle mounted atomizer with a power supply unit via the switch unit, detecting a current on/off state of the switch unit, and generating a corresponding voice prompt according to the on/off state;

wherein the gesture control method for a vehicle mounted atomizer further comprises:

causing the vehicle mounted atomizer to enter a switch control stage in a condition that a first preset time is passed and a connection of the switch unit is triggered by the first control command;

triggering a disconnection of the switch unit by the first control command after the first preset time;

causing the vehicle mounted atomizer to be in an atomization amount control stage during the first preset time and after the connection of the switch unit is triggered by the first control command;

detecting and accumulating a generation time of the first control command during the first preset time; and generating a second control command according to a mapping relationship of the generation time; wherein, the second control command triggers the switch unit to turn on or off according to a preset PWM pulse width.

2. The gesture control method for a vehicle mounted atomizer according to claim 1, wherein, the first preset time is 3-5 seconds.

3. The gesture control method for a vehicle mounted atomizer according to claim 1, further comprising:

presetting an illuminance threshold to obtain an environmental illuminance; and generating a third control command in a condition that the environmental illuminance is less than the illuminance threshold and the connection of the switch unit is detected; wherein, the third control command triggers a lighting unit of the vehicle mounted atomizer to couple with the power supply unit thereof.

4. The gesture control method for a vehicle mounted atomizer according to claim 3, further comprising:

detecting an identifier contained in the second control command during an effective period of the third control command; and generating a fifth control command according to the identifier; wherein, the fifth control command triggers a driver of the lighting unit to modulate according to the preset PWM pulse width.

5. The gesture control method for a vehicle mounted atomizer according to claim 3, further comprising:

detecting an identifier contained in the second control command during an effective period of the third control command; and generating a fifth control command according to the identifier; wherein, the fifth control command triggers a driver of the lighting unit to light up a lamp bead with a preset colour.

6. The gesture control method for a vehicle mounted atomizer according to claim 1, further comprising:

presetting an illuminance threshold to obtain an environmental illuminance; and generating a fourth control command in a condition that the environmental illuminance is greater than the illuminance threshold and the connection of the switch unit is detected; wherein, the fourth control command triggers a lighting unit of the vehicle mounted atomizer to uncouple with the power supply unit thereof.

7. The gesture control method for a vehicle mounted atomizer according to claim 1, further comprising:

transmitting a status data of the vehicle mounted atomizer in real-time to a vehicle central control via a Bluetooth connection.

* * * * *